United States Patent [19]

Moak

[11] Patent Number: 4,577,697
[45] Date of Patent: Mar. 25, 1986

[54] SOD CUTTING APPARATUS

[76] Inventor: Ross D. Moak, Rte. 1, Box 33, Athens, La. 71003

[21] Appl. No.: 591,025

[22] Filed: Mar. 19, 1984

[51] Int. Cl.⁴ .............................................. A01B 45/02
[52] U.S. Cl. ..................... 172/21; 172/573; 172/180; 172/764; 172/665
[58] Field of Search ............... 172/572, 573, 158, 166, 172/178, 180, 188, 19, 20, 21, 764, 665, 666

[56] References Cited

U.S. PATENT DOCUMENTS

| | | | |
|---|---|---|---|
| 1,796,629 | 3/1931 | Strabenow | 172/178 X |
| 1,829,745 | 11/1931 | Grossi | 172/705 X |
| 2,464,038 | 3/1949 | Horth | 172/21 |
| 3,635,291 | 1/1972 | Tomanek | 172/573 |

FOREIGN PATENT DOCUMENTS 585980  3/1947  United Kingdom ................ 172/178

Primary Examiner—Richard J. Johnson
Attorney, Agent, or Firm—John M. Harrison

[57] ABSTRACT

A sod cutting apparatus which includes a generally flat slide member having an upturned frontal portion and multiple slots extending in parallel, spaced relationship from front to rear, hinge arms pivoted to upward standing fulcrums secured to the slide member, the hinge arms and fulcrums in alignment with the slots, respectively, and round blades rotatably secured to the free ends of the hinge arms and projecting through the slots, respectively, with an adjusting mechanism secured to each hinge arm and provided with springs extending to the slide member for adjusting the tension on the blades. In a preferred embodiment, a plow attachment is mounted to the slide member rearwardly of the blades to aid in cutting and breaking up of the sod.

19 Claims, 10 Drawing Figures

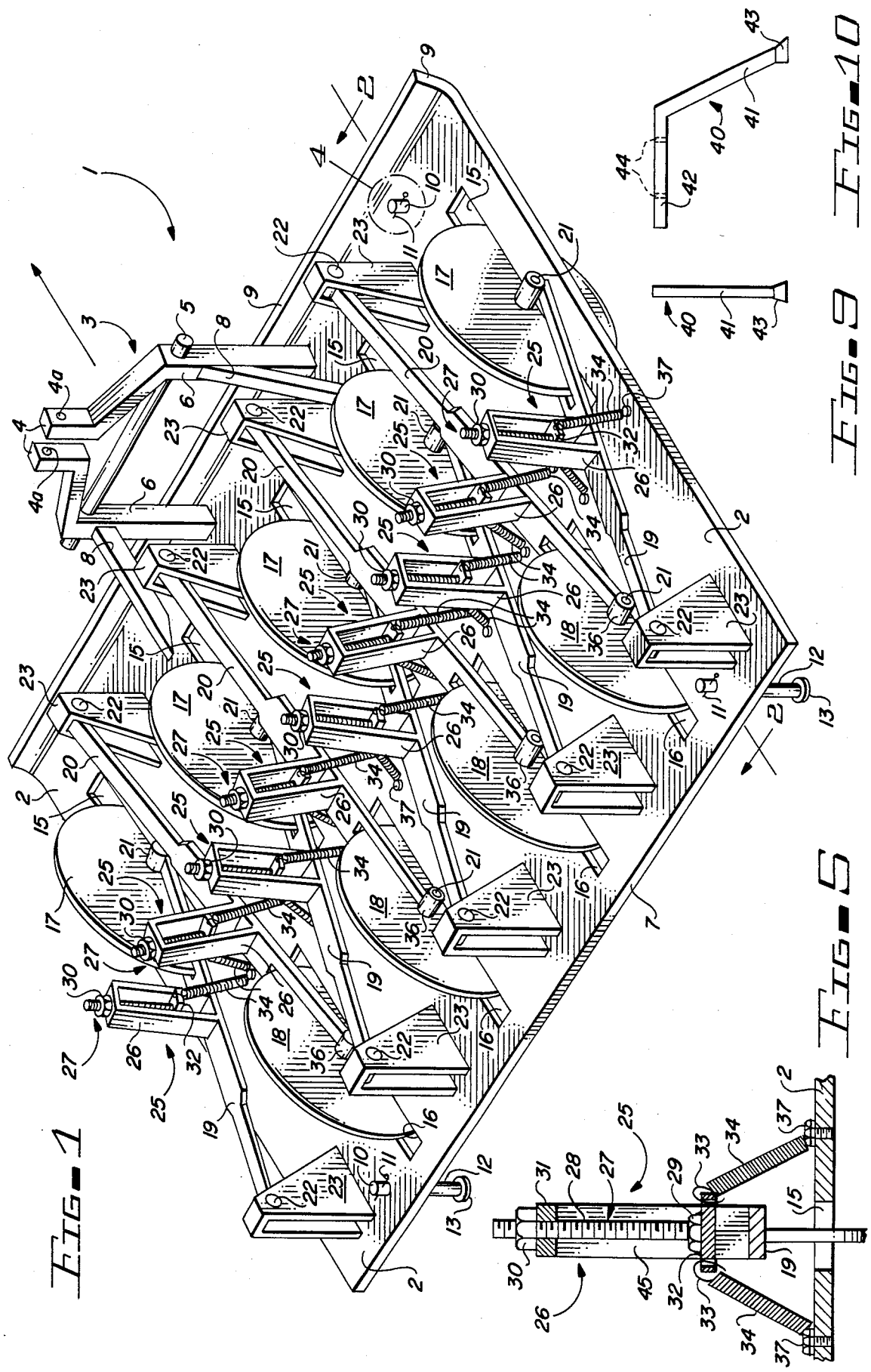

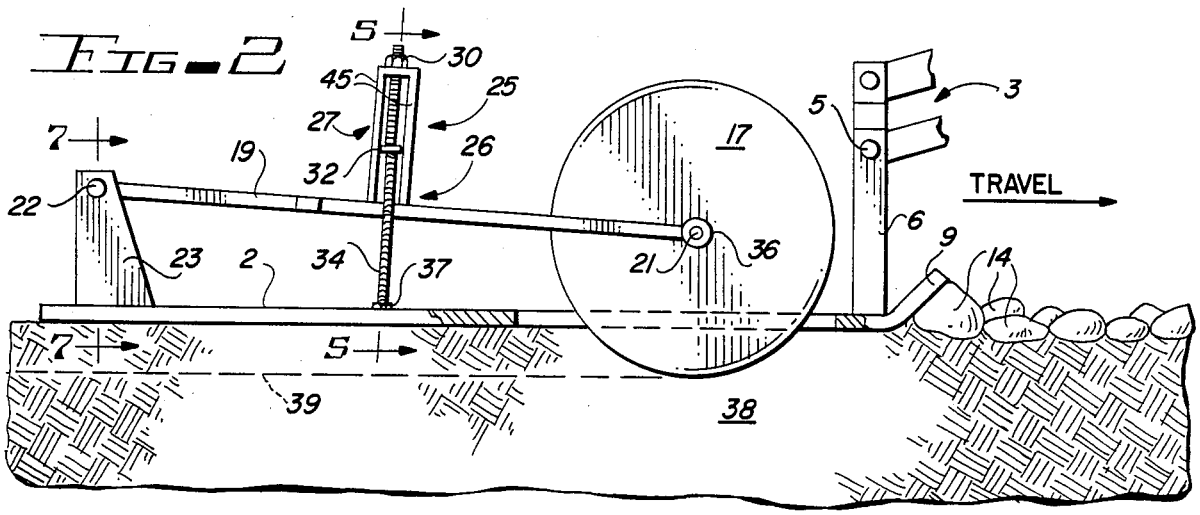
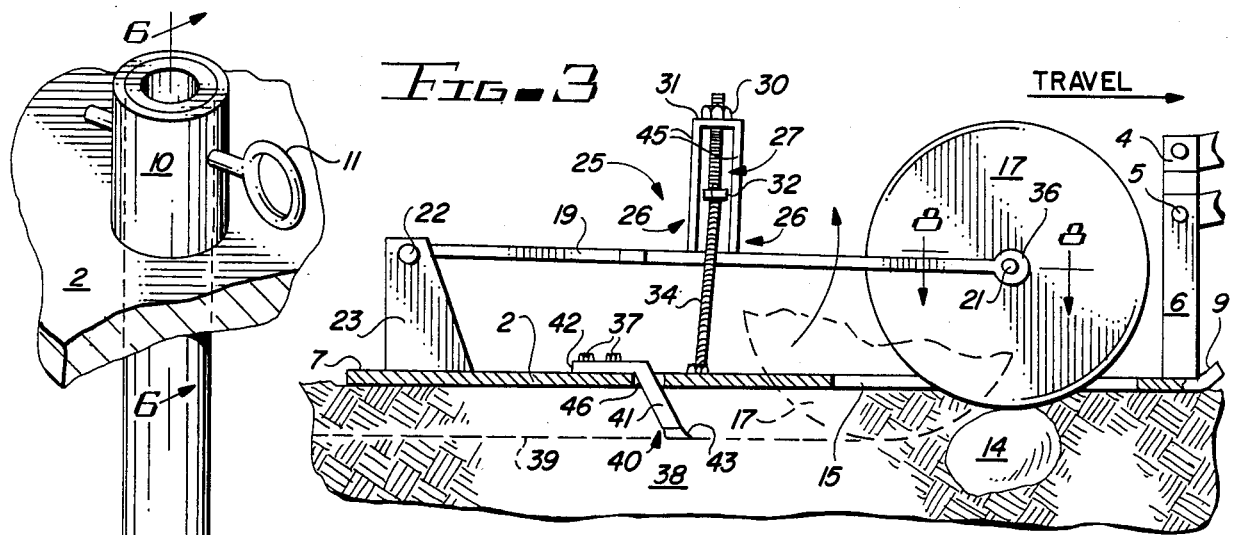
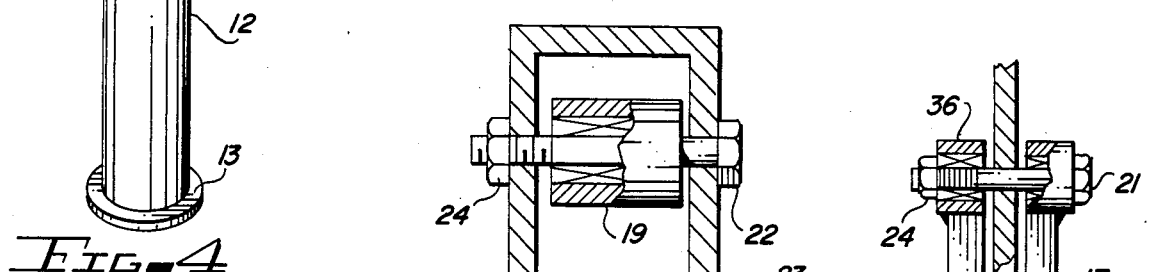
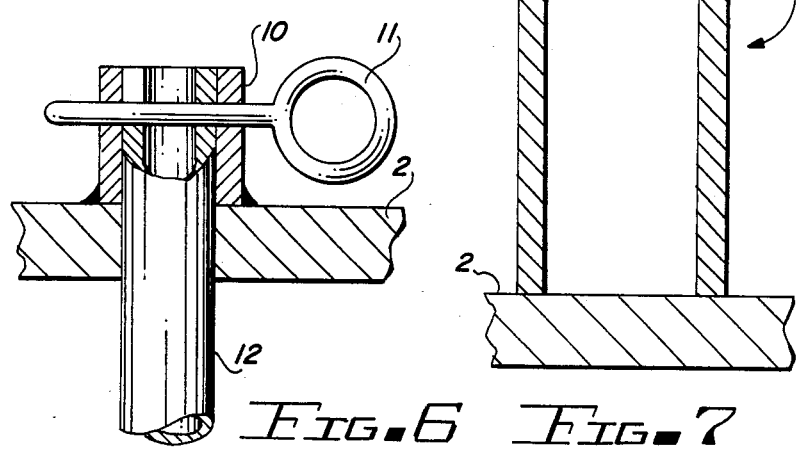
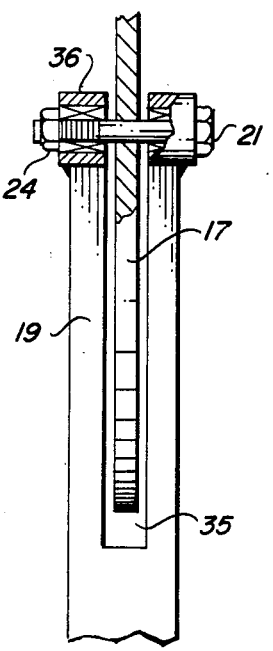

SOD CUTTING APPARATUS

BACKGROUND OF THE INVENTION

1. Field of the Invention

This invention relates to apparatus for cutting and loosening the soil without turning the soil over and more particularly, to a sod cutting apparatus which is characterized by a flat slide member having an upturned frontal portion and fitted with a three-point tractor attachment for locomotion. Multiple, round blades are mounted on the free ends of hinge arms which are pivoted on fulcrums secured to the slide, the blades extending through slots provided in the slide to cut slits of selected depth in the earth beneath the slide. Optionally, one or more plow implements can be attached to the slide member at a point rearwardly of the blades to aid in cutting and loosening the soil. The slide can be pulled in any selected pattern over a specified area of ground to be treated in order to smooth the terrain, loosen the sod and facilitate better penetration of moisture and fertilizer, resulting in deeper root growth of various plants, including hay-producing grass. The sod cutting apparatus of this invention is typically used to prepare hay fields and meadows for an increased yield of such hay-producing grass, but it can also be used in other applications, such as farming, to prepare the ground in order to obtain higher yields of various crops.

2. Description of the Prior Art

One of the problems inherent in agriculture is the compacting of the soil in fields and meadows where crops and hay-producing grasses are grown. This compaction results in lower yields of hay and crops because the root structure of the plants is weak, since the roots fail to extend deeply into the soil for proper growth. The stiff soil frequently prevents moisture and fertilizer from penetrating to any appreciable depth, particularly in the case of hay fields and meadows, where little or no cultivation is undertaken.

Conventional cultivation implements are designed primarily for farming and include such well known devices as the plow and disc, which are designed not only to cut into the sod, but also to turn it over, producing a rough topography, usually characterized by regular "rows" or furrows extending across the field. This operation is ideal under circumstances where crops are to be planted, but is not conducive to efficient growing and cutting of hay, where smooth terrain is preferred. A smooth, even terrain is desired in hay production in order to operate grass-cutting equipment effectively and realize optimum yields of hay.

Sod cutting apparatus designed to remove, and in some instances, roll or accumulate strips of sod for replanting purposes, are known in the art. An early "Sod Cutter" is disclosed in U.S. Pat. No. 1,179,795, dated Apr. 18, 1916, to M. C. Beaupre. This device includes a horse drawn sled device which resembles a plow and incorporates adjustable side and bottom cutters for removing a strip of sod without removing the strip from the ground. After cutting, the sod is rolled and preserved in selected lengths for replanting. Another "Sod Cutter" is disclosed in U.S. Pat. No. 1,942,708, dated Jan. 9, 1934, to D. Junor, et al, which device also resembles a plow and is operated by two men. The sod cutter includes topical wheels which roll on top of the sod, side cutting wheels, which cut a strip of sod corresponding to the width of the apparatus frame and a transverse cutter blade which severs the sod at a selected depth. U.S. Pat. No. 2,164,246, dated June 27, 1939, to R. Q. Kirkpatrick, discloses a "Sod Cutter" which is designed to cut the sod in strips of desired thickness and roll the severed strips in a cup-shaped member following the cutting mechanism. A "Sod Roll Forming Apparatus" is disclosed in U.S. Pat. No. 2,987,124, dated June 6, 1961, to G. R. Hadfield. This device is characterized by a rotating knife mounted on a wheel-supported, traveling frame and designed to sever the sod into selected lengths. The sod strips are manipulated at the blade into an initial roll lap, such that the trailing sod drags engage the lapped roll and complete the rolling of each strip. U.S. Pat. No. 3,469,635, dated Sept. 30, 1969, to J. J. Hart, discloses "Sod Cutting Machines" which are drawn by a tractor. A typical machine is characterized by a sod cutter having parallel bars forming a main frame and a cutting share mounted on the lower end of a tilting support which is pivotally mounted between the parallel bars. The depth of cut is selected by means of an adjusting mechanism and the bottom cutting knife is designed to sever two strips of sod simultaneously, while outer knives cut the sides of each sod strip. A "Sod Cutter" which is designed to be operated by a backhoe is disclosed in U.S. Pat. No. 4,049,060, dated Sept. 20, 1977, to C. R. Hoke. This device includes an elongated blade maintained parallel to the earth at a controlled length by a depth control mechanism and featuring a cross bar spanning the blade and pivotally connected to the blade. The cross bar can be attached to a backhoe to draw the blade through the sod and detach a strip of sod of selected length, width and depth. A tractor-mounted "Turf Cutting and Rolling Apparatus" is disclosed in U.S. Pat. No. 4,354,556, dated Oct. 19, 1982, to M. L. Evans. This device is equipped with parallel side cutters located forward of a horizontal bottom cutter, which cutters in combination operate to cut a strip of sod or turf as the tractor advances. The cut sod is then rolled on a roller carrier located behind the tractor.

It is an object of this invention to provide a sod cutting apparatus for flattening the terrain of a field and loosening the soil to facilitate better penetration of air, water and fertilizer and stimulate deeper plant root growth.

Another object of this invention is to provide a new and improved sod cutting apparatus which is provided with a flat slide and rotating blades for flattening and penetrating the soil without turning the sod over, in order to enhance aeration as well as water and fertilizer penetration into the soil.

Yet another object of the invention is to provide an effective, yet simple and safe apparatus for slitting or cutting sod to a selected depth and in a selected pattern without destroying hay-producing grass, in order to increase air, moisture and fertilizer penetration into the soil and simultaneously flatten and smooth the terrain.

A still further object of the invention is to provide a sod cutting apparatus for leveling rough terrain and cutting the soil to a predetermined depth and in a predetermined pattern to facilitate better aeration, moisture and fertilizer penetration, which apparatus includes a flat slide provided with multiple parallel slots and round blades projecting through the slots, the blades rotatably mounted on hinge arms which are spring-mounted on the slide to adjust the depth of penetration of the blades.

Still another object of the invention is to provide a new and improved tractor-drawn sod cutting apparatus for improving hay and crop-growing fields, which apparatus will not disturb the contour of the fields, but operates to level the terrain and penetrate the sod smoothly and evenly in a selected pattern and at a controlled depth to facilitate good fertilizer, moisture, and air penetration and promote optimum root growth and plant health.

SUMMARY OF THE INVENTION

These and other objects of the invention are provided in a new and improved sod cutting apparatus which is designed to smooth, penetrate and level terrain, which apparatus is characterized by a generally flat slide having a three point tractor attachment, an upturned frontal portion and at least one, and preferably multiple slots provided in alternating relationship from front to rear, with rotatable blades extending through the slots and carried by hinge arms mounted on the slide and an adjusting mechanism in cooperation with the slide and the hinge arms for adjusting the depth of penetration of the blades, with optional plow implements removably attached to the slide at points rearwardly of the blades to better facilitate breaking up the sod beneath the surface of the ground.

BRIEF DESCRIPTION OF THE DRAWINGS

The invention will be better understood by reference to the accompanying drawings, wherein:

FIG. 1 is a perspective view of a preferred sod cutting apparatus having multiple circular blades mounted thereon;

FIG. 2 is a side sectional view of the sod cutting apparatus, more particularly illustrating one of the hinge arm and blade combinations;

FIG. 3 is a side sectional view of the sod cutting apparatus illustrated in FIG. 2, with the circular blade illustrated in an upward orientation by contact with an obstacle and further illustrating an optional plow attachment;

FIG. 4 is a perspective view, partially in section, of a preferred leg and leg sleeve design for supporting the sod cutting apparatus;

FIG. 5 is a sectional view, taken along lines 5—5 in FIG. 2, more particularly illustrating a preferred blade adjustment apparatus;

FIG. 6 is a side view, partially in section, of the leg sleeve illustrated in FIG. 4;

FIG. 7 is a sectional view of a fulcrum;

FIG. 8 is a plan view, partially in section, of a blade mount and hinge arm slot for deploying the blades in the sod cutting apparatus;

FIG. 9 is a front view of an optional plow attachment; and

FIG. 10 is a side view of the plow attachment illustrated in FIG. 9.

DESCRIPTION OF THE PREFERRED EMBODIMENTS

Referring to FIGS. 1, 7 and 8 of the drawings the sod cutting apparatus of this invention is generally illustrated by reference numeral 1 and is shown at rest, supported by the four legs 12, each fitted with a foot 13. The sod cutting apparatus 1 includes a generally flat slide member 2, provided with an upturned frontal portion 9 and including forward slots 15 and rear slots 16, provided in spaced, staggered relationship with respect to each other. A first set of fulcrums 23 is mounted in spaced relationship on the slide member 2 just rearwardly of the frontal portion 9 and in alignment with the rear slots 16, respectively, and a second set of fulcrums 23 is mounted on the slide member 2 forward of the rear edge 7 and in alignment with the forward slots 15, respectively. Multiple forward hinge arms 19 are each pivoted at one end to one of the fulcrums 23 located near the rear edge 7 of the slide member 2, respectively, by means of hinge bolts 22 and cooperating nuts 24 and the forward hinge arms 19 extend forwardly and downwardly to a point approximately midway of the forward slots 15, as illustrated in FIGS. 1 and 7. A forward blade 17 is situated in each of the hinge arm slots 35 provided in the extending ends of each of the forward hinge arms 19, by means of blade mount bolts 21 and cooperating nuts 24, as is more particularly illustrated in FIG. 8. A blade mount 36 is provided on the free end of each of the forward hinge arms 19 and is designed to accommodate blade mount bolt 21, to facilitate free rotation of the forward blades 17 with respect to the forward hinge arms 19 in the forward slots 15 of the slide member 2. Similarly, the rear hinge arms 20 are pivotally secured to the forward ones of the fulcrums 23, respectively, by means of additional hinge bolts 22 and cooperating nuts 24. The rear hinge arms 20 extend rearwardly toward the rear edge 7 and terminate near the center of the rear slots 16, respectively. Rear blades 18 are located in the rear slots 16 in the slide member 2 and are rotatably secured in hinge arm slots 35 provided in the blade mounts 36, located on the ends of the rear hinge arms 20, respectively, by means of blade mount bolts 21 and cooperating nuts 24. It will be appreciated from a consideration of FIG. 1 that the staggered forward slots 15 and rear slots 16 are sufficiently wide to permit unrestricted vertical movement of the forward blades 17 and the rear blades 18, respectively, to facilitate slicing of the forward blades 17 and rear blades 18 into the soil underlying the sod cutting apparatus 1 to a depth of up to the radius of both the forward blades 17 and rear blades 18, respectively.

Referring now to FIGS. 1, 4 and 6 of the drawings in a most preferred embodiment of the invention a leg sleeve 10 is welded or otherwise secured to the top surface near each of the four corners of the slide member 2 and is provided with an aperture to receive a pin 11. Legs 12, having a slightly smaller outside diameter than the inside diameter of the leg sleeve 10, are inserted through an aperture in the slide member 2 which registers with the internal bore of the leg sleeve 10 and the legs 12 are removably secured in the leg sleeve 10 by the pin 11, in order to support the sod cutting apparatus 1 when the device is not in use, as illustrated in FIG. 1. Accordingly, when four of the legs 12 are inserted through the slide member 2 and into the leg sleeves 10 as illustrated in FIGS. 4 and 6 and the pin 11 is inserted in registering pin apertures (not illustrated) provided in both the leg sleeve 10 and the legs 12, the sod cutting apparatus 1 can be supported off the ground, as illustrated in FIG. 1. In another most preferred embodiment the legs 12 are each provided with a foot 13, which helps prevent the legs 12 from sinking into the ground as a result of the weight of the sod cutting apparatus 1.

As further illustrated in FIG. 1 a conventional three-point attachment is generally illustrated by reference numeral 3 and is included in the sod cutting apparatus 1 in order to attach the slide member 2 to a tractor for use. Accordingly, a pair of opposed center clevis hooks 4, mounted on connecting arms 6 are used in cooperation with a lift arm pin 5 and hook apertures 4a to join the three-point attachment 3 to the tractor in removable relationship. Braces 8 extend from the connecting arms 6 to the slide member 2 and are welded or otherwise secured to the slide member 2, in order to brace the three point attachment 3 in upward standing configuration, as illustrated in FIG. 1.

Referring now to FIGS. 1 and 5 of the drawings in a most preferred embodiment of the invention a blade adjustment is generally illustrated by reference numeral 25 and includes a generally U-shaped adjustment bracket 26, welded or otherwise secured by means of bracket legs 45 to each of the forward hinge arms 19 and rear hinge arms 20, as illustrated. The open area of the adjustment bracket 26 between the bracket legs 45 accomodates a spring bolt 27 having a spring bolt head 29, which is welded or otherwise secured to a spring mount plate 32, slidably positioned between the bracket legs 45. The threaded end of the spring bolt 28 is disposed upwardly through the bracket end 31 of the adjustment bracket 26 and the spring bolt threads 28 receive an adjusting nut 30, which is threaded on the spring bolt threads 28 to seat against the bracket end 31 of the adjustment bracket 26. A spring mount ring 33 is welded or otherwise attached to each projecting end of the spring mount plate 32 and each spring mount ring 33 receives one end of a spring 34, the opposite ends of the springs 34 being secured to the slide member 2 by means of spring mount bolts 37, respectively. Accordingly, adjustment of the adjusting nut 30 on the spring bolt threads 28 varies the tension in the springs 34, which in turn adjusts the downward force with which the forward blades 17 and the rear blades 18 cut into the underlying soil 38, as hereinafter described.

Referring now to FIGS. 3, 9 and 10 of the drawings in another preferred embodiment of the invention a plow 40 extends through a slot 46 in the slide member 2 and is bolted by means of a plow bracket 42, having bracket apertures 44 and mount bolts 37, to the slide member 2. A plow leg 41 extends downwardly and forwardly from the plow bracket 42 through the slot 46 and terminates in a shaped share 43, which follows the forward blade 17 and aids in loosening the soil 38. One or more of these plows 40 can be bolted to the slide member 2 behind each, or selected ones of the forward blades 17 and rear blades 18, as desired, in order to loosen the soil 38 to a desirable extent.

In operation, and referring again to FIGS. 1 and 2, the sod cutting apparatus 1 is attached to a tractor by means of the three-point attachment 3 as heretofore described and as is well known by those skilled in the art. The sod cutting apparatus 1 is then raised to a point where the legs 12 can be removed from association with the leg sleeves 10, upon removal of the pins 11. The slide member 2 is then lowered into contact with the soil 38 and the tension in the springs 34, coupled with the weight of the forward blades 17, forward hinge arms 19, rear hinge arms 20 and the rear blades 18, causes the forward blades 17 and rear blades 18 to cut into the soil 38, as illustrated in FIG. 2. When the sod cutting apparatus is pulled forward in the direction of the arrow by the tractor, the forward blades 17 and rear blades 18 cut parallel slits in the soil 38, the depth of which slits is indicated by the blade traverse line 39. Furthermore, when installed as illustrated in FIG. 3, the plow 40 enlarges and further defines the parallel slits to aid in breaking up the underlying soil 38. In this manner the soil 38 is cut to a predetermined depth determined primarily by the tension in the springs 34 and in a desired pattern, which is determined by the path of the tractor.

Referring again to FIG. 3 of the drawings, in addition to serving the function of determing the depth of the blade traverse line 39, the springs 34 also serve to facilitate upward movement of the forward blades 17 and the rear blades 18 upon encountering an obstacle such as a rock 14, lying beneath or on the surface of the soil 38. Upon such an occurrence, the respective forward blades 17 and rear blades 18 which encounter the rock 14 or other obstacle, are caused to move upwardly in the direction of the arrow against the bias in the springs 34 and when the obstacle is traversed, the blade returns to the depth of the blade traverse line 39. As heretofore described, the tension on the springs 34 can be increased to force the forward blades 17 and rear blades 18 downwardly with a greater force, by tightening the adjusting nut 30 on the spring bolt 27 and decreasing the distance between the spring mount plate 32 and the bracket end 31. Conversely, the pressure exerted on the underlying soil 38 by the forward blades 17 and rear blades 18 can be reduced by loosening the adjusting nut 30 on the spring bolt 27 and increasing the distance between the spring mount plate 32 and the bracket end 31, to decrease the tension in the springs 34.

It will be appreciated by those skilled in the art that a selected number of the forward blades 17 and rear blades 18 can be mounted on the slide member 2 as deemed expedient and necessary, depending upon the size of the meadow or field to be traversed and the tractor to be used. Furthermore, the forward blades 17 and rear blades 18 can be arranged in preferred front and rear, staggered relationship as illustrated, or a desired number of forward blades 17 only, utilized. In the alternative, a desired number of rear blades 18 can be utilized as deemed expedient and necessary by those skilled in the art. Furthermore, while the size and spacing of the forward blades 17 and rear blades 18 can be varied to suit the size and desired blade arrangement in the sod cutting apparatus 1, in a most preferred embodiment of the invention, the forward blades 17 and rear blades 18 are about 20 inches in diameter.

While the preferred embodiments of the invention have been described above it will be recognized and understood that various modifications may be made therein and the appended claims are intended to cover all such modifications which may fall within the spirit and scope of the invention.

Having described my invention with the particularity set forth above, what is claimed is:

1. A sod cutting apparatus comprising:
   (a) a slide member;
   (b) at least one slot provided in longitudinal orientation in said slide member;
   (c) at least one fulcrum secured to said slide member in substantial alignment with said slot;
   (d) at least one hinge arm having one end pivotally attached to said fulcrum and the opposite end of said hinge arm extending to said slot;
   (e) at least one blade means rotatably secured to said opposite end of said hinge arm and positioned in registration with said slot; and
   (f) an adjusting bracket attached to said hinge arm, a bolt extending upwardly through said adjusting bracket, bias means attached to said bolt and to said slide member and a nut threadably secured on said bolt for maintaining said bolt in said adjusting bracket, adjusting the tension in said bias means and adjusting the depth of penetration of said blade means into the soil beneath said slide member when said slide member is caused to traverse the soil by a motive force.

2. The sod cutting apparatus of claim 1 further comprising attachment means in cooperation with said slide member for connecting said slide member to a vehicle.

3. The sod cutting apparatus of claim 2 wherein said attachment means is a three-point attachment mechanism and said vehicle is a tractor.

4. The sod cutting apparatus of claim 2 wherein:
(a) said attachment means is a three-point attachment mechanism and said vehicle is a tractor; and
(b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means.

5. The sod cutting apparatus of claim 2 wherein;
(a) said attachment means is a 3-point attachment mechanism and said vehicle is a tractor; and
(b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means.

6. The sod cutting apparatus of claim 2 wherein:
(a) said attachment means is a three-point attachment mechanism and said vehicle is a tractor;
(b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means; and
(c) said slots, said fulcrums, said hinge arms and said blade means are arranged in alternating relationship with a first alternating row of said blade means facing forwardly of said slide member and a second alternating row of said blade means facing rearwardly of said slide member.

7. The sod cutting apparatus of claim 2 further comprising at least one plow means carried by said slide member in substantial alignment with said blade means for further loosening the sod traversed by said blade means and wherein;
(a) said attachment means is a 3-point mechanism and said vehicle is a tractor;
(b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means.

8. The sod cutting apparatus of claim 7 wherein said slots, said fulcrums, said hinge arms and said blade means are arranged in alternating relationship with a first alternating row of said blade means facing forwardly of said slide member and a second alternating row of said blade means facing rearwardly of said slide member.

9. The sod cutting apparatus of claim 7 further comprising support legs removably carried by said slide member for supporting said slide member when said slide member is not in use.

10. The sod cutting apparatus of claim 9 wherein said bias means is a pair of coil springs.

11. The sod cutting apparatus of claim 1 wherein said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means.

12. The sod cutting apparatus of claim 11 wherein said slots, said fulcrums, said hinge arms and said blade means are arranged in alternating relationship with a first alternating row of said blade means facing forwardly of said slide member and a second alternating row of said blade means facing rearwardly of said slide member.

13. The sod cutting apparatus of claim 1 further comprising at least one plow means carried by said slide member in substantial alignment with said blade means for further loosening the sod traversed by said blade means.

14. The sod cutting apparatus of claim 1 further comprising support legs removably carried by said slide member for supporting said slide member when said slide member is not in use.

15. The sod cutting apparatus of claim 1 wherein said bias means further comprises at least one coil spring.

16. A sod cutting apparatus comprising:
(a) a generally flat slide member having an upturned frontal portion;
(b) a plurality of slots provided in longitudinal orientation in said slide member;
(c) a plurality of fulcrums mounted on said slide member, each of said fulcrums provided in spaced, substantial alignment with one of said slots, respectively;
(d) a plurality of hinge arms pivotally carried by said fulcrums, each of said hinge arms having one end extending to one of said slots, respectively;
(e) a circular blade rotatably carried by said one end of each of said hinge arms, said blade provided in registration with one of said slots, respectively; and
(f) a blade adjusting means mounted on each of said hinge arms and bias means carried by said blade adjusting means and connected to said slide member, whereby tension is adjustably applied to said blade.

17. The sod cutting apparatus of claim 16 wherein said blade adjusting means further comprises an adjusting bracket attached to said hinge arm, a bolt extending upwardly through said adjusting bracket, bias means attached to said bolt and to said slide member and a nut threadibly secured on said bolt for maintaining said bolt in said adjusting bracket and adjusting the tension in said bias means.

18. The sod cutting apparatus of claim 17 wherein said bias means is a pair of coil springs.

19. The sod cutting apparatus of claim 18 further comprising attachment means in cooperation with said slide member for connecting said slide member to a vehicle.

* * * * *